(12) United States Patent
Tojo et al.

(10) Patent No.: US 12,249,197 B2
(45) Date of Patent: Mar. 11, 2025

(54) NOTIFYING DEVICE

(71) Applicant: Isuzu Motors Limited, Tokyo (JP)

(72) Inventors: Tomokazu Tojo, Fujisawa (JP); Tomoaki Sasaki, Fujisawa (JP); Naoki Takahashi, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 295 days.

(21) Appl. No.: 17/795,583

(22) PCT Filed: Jan. 29, 2021

(86) PCT No.: PCT/JP2021/003236
§ 371 (c)(1),
(2) Date: Jul. 27, 2022

(87) PCT Pub. No.: WO2021/153731
PCT Pub. Date: Aug. 5, 2021

(65) Prior Publication Data
US 2023/0105672 A1    Apr. 6, 2023

(30) Foreign Application Priority Data

Jan. 30, 2020    (JP) ................................. 2020-013537

(51) Int. Cl.
*G07C 5/08*    (2006.01)

(52) U.S. Cl.
CPC ......... *G07C 5/0816* (2013.01); *G07C 5/0808* (2013.01)

(58) Field of Classification Search
CPC .. G07C 5/0816; G07C 5/0808; G07C 5/0825; G07C 5/0833; G05D 2101/00–26; G05D 1/00–12; G05D 25/00

USPC .......................... 701/34.4, 64, 113, 301, 514
See application file for complete search history.

(56) References Cited

U.S. PATENT DOCUMENTS

| | | | |
|---|---|---|---|
| 6,438,491 B1 * | 8/2002 | Farmer ................ | G06V 10/255 340/436 |
| 10,147,247 B2 * | 12/2018 | Nishida .................. | G07C 5/008 |
| 10,399,495 B1 * | 9/2019 | Osborne ................ | B60Q 9/008 |
| 2005/0199209 A1 * | 9/2005 | Shimokawa ........ | F02N 11/0822 123/198 DB |
| 2006/0095194 A1 * | 5/2006 | Arai ................ | B60W 30/18018 701/96 |
| 2006/0250297 A1 * | 11/2006 | Prakah-Asante ..... | G01S 13/862 367/87 |

(Continued)

FOREIGN PATENT DOCUMENTS

| | | |
|---|---|---|
| CN | 104221067 | 12/2014 |
| CN | 105882518 | 8/2016 |

(Continued)

*Primary Examiner* — Manglesh M Patel

(57) ABSTRACT

This notifying device is provided with: a notifying unit which detects an object present at the periphery of a vehicle, and notifies a passenger of the presence of the object; and a notification control unit in which a low departure operation, among the operations of an operating unit for operating the vehicle, for which the intention of the driver to depart is estimated to be at most equal to a predetermined threshold, is set in advance, wherein, if the low departure operation is executed while the vehicle is stopped, the notification control unit controls the notifying unit to suppress the level of notifications compared with a situation in which the vehicle is traveling.

3 Claims, 2 Drawing Sheets

(56) References Cited

U.S. PATENT DOCUMENTS

| | | | |
|---|---|---|---|
| 2010/0023234 A1* | 1/2010 | Kameyama | B60W 30/08 |
| | | | 701/1 |
| 2011/0115615 A1* | 5/2011 | Luo | B60R 1/30 |
| | | | 348/148 |
| 2012/0062743 A1* | 3/2012 | Lynam | B60W 40/02 |
| | | | 348/148 |
| 2012/0166058 A1* | 6/2012 | Armbrust | B60W 30/17 |
| | | | 701/1 |
| 2012/0277989 A1 | 11/2012 | Zeller | |
| 2015/0051753 A1 | 2/2015 | Kawamata et al. | |
| 2015/0183370 A1 | 7/2015 | Nakanishi et al. | |
| 2016/0114726 A1* | 4/2016 | Nagata | B60Q 9/007 |
| | | | 340/435 |
| 2016/0240084 A1 | 8/2016 | Takeuchi | |
| 2018/0178782 A1* | 6/2018 | Saiki | B60W 30/09 |
| 2022/0305984 A1* | 9/2022 | Mimura | B60Q 1/30 |
| 2023/0373649 A1* | 11/2023 | Neis | B64D 45/00 |
| 2024/0140434 A1* | 5/2024 | Abe | B60W 30/143 |

FOREIGN PATENT DOCUMENTS

| | | |
|---|---|---|
| CN | 106114352 | 11/2016 |
| CN | 106809160 | 6/2017 |
| JP | 2002-269697 | 9/2002 |
| JP | 2005-173703 | 6/2005 |
| JP | 2011-063225 | 3/2011 |
| JP | 2013-141953 | 7/2013 |
| JP | 5456123 | 1/2014 |
| JP | 2019-008415 | 1/2019 |

\* cited by examiner

NOTIFYING DEVICE

TECHNICAL FIELD

The present disclosure relates to a notification apparatus.

BACKGROUND ART

In the related art, a blind spot monitor (BSM) or other notification apparatus that detects objects approaching a vehicle by transmitting, for example, millimeter wave radar around the vehicle and notifies passengers in the vehicle of the approach of the object has been in practical use. Here, commercial vehicles such as trucks are required to detect objects in a wide range from the front of the vehicle to the side of the vehicle because the driver cannot directly see the objects in a wide range.

In view of this, as a technology for detecting objects in a wide range, for example, PTL 1 discloses an apparatus in which a millimeter wave radar is placed at the front of a vehicle and six cameras are placed at the front, both sides, and rear of the vehicle.

CITATION LIST

Patent Literature

PTL 1
Japanese Patent Application Laid-Open No. 2011-063225

SUMMARY OF INVENTION

Technical Problem

However, if the apparatus of PTL 1 is operated when the vehicle is stopped, for example, the presence of an object is reported even during a rest period even when the driver has no intention of starting the vehicle, and the notification can be bothersome to passengers.

An object of the present disclosure is to provide a notification apparatus that reduces the notification that is bothersome to the passenger.

Solution to Problem

A notification apparatus according to the present disclosure includes: a notification part configured to detect an object located around a vehicle and provide a passenger with a notification of presence of the object; and a notification control part in which among operations of an operation part for operating the vehicle, a low start operation that is estimated that a driver's intention to start is equal to or smaller than a predetermined threshold value is set in advance, the notification control part being configured such that when the low start operation is executed in a stopped vehicle, the notification control part controls the notification part so as to suppress a level of a notification than when the vehicle is travelling.

Advantageous Effects of Invention

According to the present disclosure, the notification that is bothersome to the passenger can be reduced.

DESCRIPTION OF EMBODIMENTS

Embodiments according to the present disclosure are described below with reference to accompanying drawings.

Figure 1:
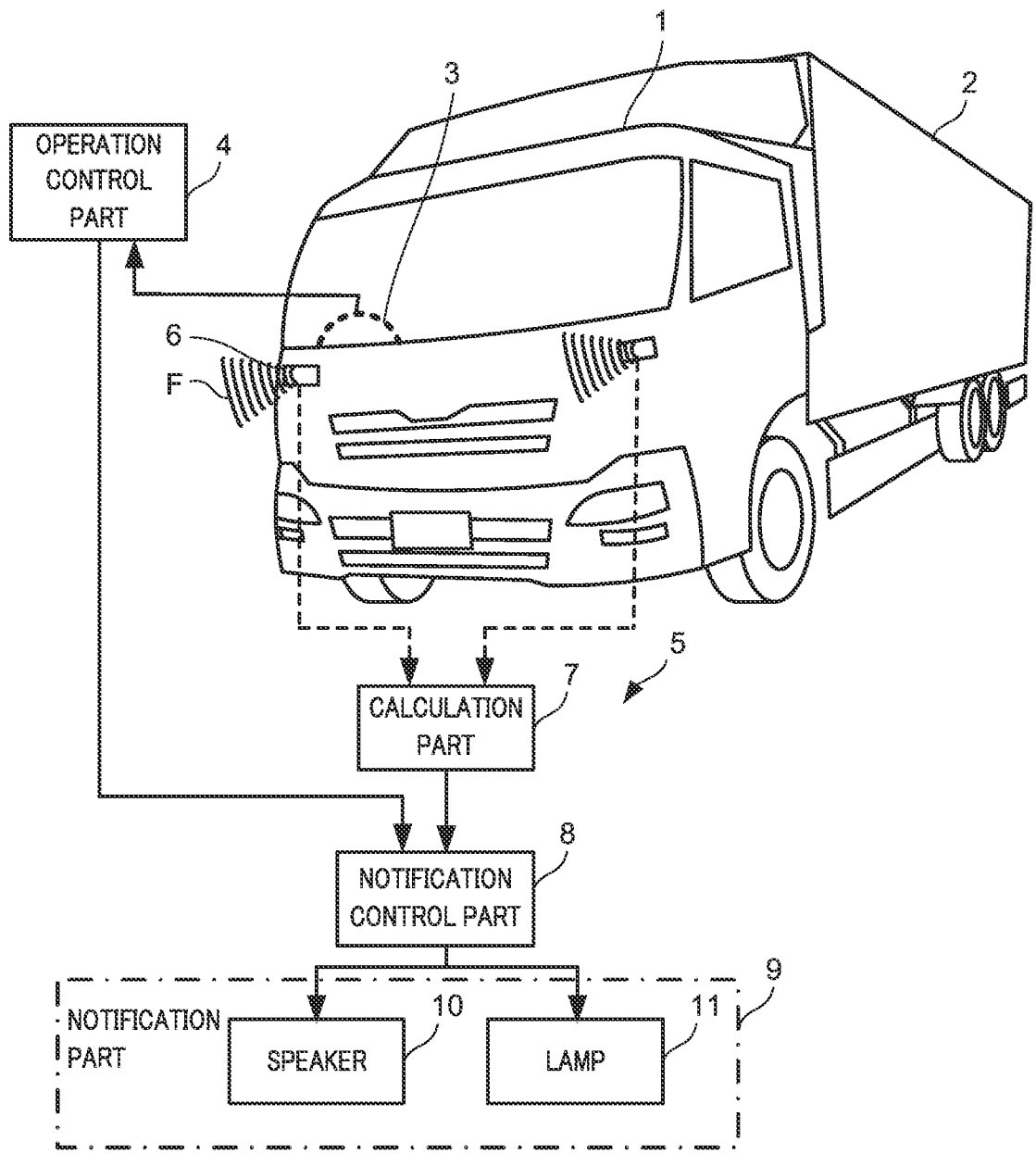
FIG. 1 is a diagram illustrating a configuration of a vehicle including a notification apparatus according to an embodiment of the present disclosure.

FIG. 1 is a diagram illustrating a configuration of a vehicle including a notification apparatus according to an embodiment of the present disclosure. The vehicle includes cabin 1, loading part 2, operation part 3, operation control part 4, and notification apparatus 5. Examples of the vehicle include a commercial vehicle such as a truck.

Cabin 1 is configured for passengers to board, and disposed in the front part of the vehicle. Loading part 2 is configured to carry load, and is disposed at the rear of the vehicle relative to cabin 1, for example. Loading part 2 is formed in a shape that is long in the vehicle front-rear direction so as to extend from the vicinity of the rear part of cabin 1 to the vehicle rear part.

Operation part 3 is configured for the driver of the vehicle to operate each part of the vehicle, and disposed in the driver's seat in cabin 1. Operation part 3 includes a transmission switching part, a parking brake, a foot brake and a slope start auxiliary apparatus, for example.

The transmission switching part is composed of a shift lever that can select a parking range, a drive range, a neutral range and a reverse range, for example. Here, the parking range is for locking the wheel to prevent the rotation in a vehicle stop state. The drive range is for driving the vehicle forward. The neutral range is for disconnecting the power transfer path such that the driving force from the engine is not transmitted to the wheel. The reverse range is for driving the vehicle backward.

The parking brake is a so-called friction brake, and may be configured of wheel park type that brakes the wheel by releasing a compressed spring, for example.

The foot brake is operated by the driver's foot to brake the wheels with a braking force corresponding to the force of the driver's foot. The foot brake is configured to brake the wheels in a hydraulic, pneumatic, or the like manner, for example.

The slope start auxiliary apparatus is for maintaining the braking force even when the foot brake is released in the vehicle stop state. The slope start auxiliary apparatus may be configured to maintain the braking force by determining that the vehicle has stopped when the foot brake is depressed for a predetermined time, and to release it when the transmission switching part is switched to the drive range or the reverse range, for example.

Operation control part 4 is connected to operation part 3, and controls each part of the vehicle such as the brake part and the driving part in accordance with an operation signal from operation part 3.

Notification apparatus 5 includes a pair of detection parts 6 disposed in the front part of cabin 1, and calculation part 7, notification control part 8 and notification part 9 are sequentially connected to the pair of detection parts 6. In addition, notification control part 8 is also connected to operation control part 4. Notification apparatus 5 may be composed of a blind spot monitor, for example.

Detection part 6 is configured to detect an object located around the vehicle, and is disposed in the vicinity of the right side part and the vicinity of the left side part in the front part of cabin 1. Detection part 6 may be composed of a millimeter-wave radar that detects an object by transmitting and receiving millimeter waves, for example. Detection part 6 includes a detection surface oriented toward the vehicle front side, transmits and receives millimeter wave F from the detection surface, and detects the object present in the detection range extending in the front of the detection surface. Detection part 6 is formed to have the detection range of 150 degrees in front of the detection surface, for example.

Calculation part 7 calculates the position of the object on the basis of the detection information of detection part 6. Then, calculation part 7 determines whether the position of the object is less than or equal to a predetermined distance from the vehicle, and when it is less than or equal to the predetermined distance, it outputs an approach signal to notification control part 8.

Notification control part 8 controls notification part 9 so as to provide a notification of the approach of the object on the basis of the approach signal output from calculation part 7. Here, notification control part 8 determines whether the vehicle is stopped by acquiring the driving information including the operation information of operation part 3 from operation control part 4. When the vehicle is stopped, i.e., the vehicle is travelling, notification control part 8 controls notification part 9 so as to provide the notification at the normal degree without suppressing the level of the notification. On the other hand, when the vehicle is stopped, notification control part 8 controls notification part 9 so as to suppress the level of the notification on the basis of the operation information of operation part 3. At this time, among the operations of operation part 3, a low start operation that is estimated that there is no driver's intention to start, i.e., the threshold value is zero is set in advance, and when the low start operation is executed, notification control part 8 controls notification part 9 so as to suppress the level of the notification than when the vehicle is travelling. In addition, when a high start operation that is estimated to be a driver's intention to start is set in advance and a high start operation is executed, notification control part 8 controls notification part 9 so as to set the level of the notification to a value greater than when the low start operation is executed and is smaller than when the vehicle is travelling.

Notification part 9 is disposed in the vehicle interior of cabin 1, and provides a notification of the presence of an object around the vehicle to the passenger in cabin 1 under the control of notification control part 8. Notification part 9 includes speaker 10 and lamp 11, and speaker 10 and lamp 11 are connected to notification control part 8.

Speaker 10 is disposed at a pair of pillars in the interior of cabin 1, and provides the passenger with a notification of the presence of an object in the form of sound, for example. Lamp 11 is disposed at a pair of pillars in the interior of cabin 1, and provides the passenger with a notification of the presence of an object in the form of light.

Note that the function of notification apparatus 5 can also be implemented with a computer program. For example, the reading apparatus of the computer reads a program for implementing the function of notification apparatus 5 from a recording medium in which the program is recorded, and stores it in the storage apparatus. Then, the CPU copies, in the RAM, the program stored in the storage apparatus, sequentially reads the command included in the program from the RAM and executes it, and thus, the function of notification apparatus 5 can be achieved.

Next, an operation of the present embodiment is described.

First, as illustrated in FIG. 1, the driver operates the vehicle by operating operation part 3, and its operation signal is output from the operation of operation part 3 to control part 4. Operation control part 4 controls each part of the vehicle such as the brake part and the driving part on the basis of the operation signal of operation part 3, and outputs the driving information including the operation information of operation part 3 to notification control part 8.

In addition, detection part 6 transmits and receives millimeter wave F, and its reception signal is output to calculation part 7. At this time, when an object is present around the vehicle, millimeter wave F reflected by the object is received by detection part 6 in a short time, and a reception signal including the detection information of the object is output to calculation part 7. Calculation part 7 acquires detection information from the reception signal sequentially output from detection part 6, and calculates the position of the object with respect to the vehicle on the basis of the detection information. Subsequently, calculation part 7 determines whether the position of the object is less than or equal to a predetermined distance from the vehicle, and when it is equal to or smaller than the predetermined distance, it is determined that an object is approaching the vehicle, and, an approach signal is output to notification control part 8.

Here, notification control part 8 determines whether the vehicle is stopped on the basis of the operation information output from operation control part 4. Notification control part 8 can determine the stop on the basis of the vehicle speed, the opening of the accelerator, the presence/absence of the foot brake, the presence/absence of the parking brake, the selected position of the transmission switching part, and the like, for example.

When it is determined that the vehicle is stopped, i.e., the vehicle is travelling, and the approach signal indicating the approach of the object is input from calculation part 7, notification control part 8 controls notification part 9 so as to provide the notification at the normal degree without changing the level of the notification for the passenger. This allows the passenger to recognize the approaching object and stop the vehicle, etc., to prevent the object from colliding with the vehicle.

On the other hand, when it is determined that the vehicle is stopped, notification control part 8 determines whether the operation of operation part 3 is the low start operation that is estimated that there is no driver's intention to start on the basis of the operation information of operation part 3. Here, among the operations of operation part 3, the low start operation that is estimated that there is no driver's intention to start the vehicle forward and rearward, i.e., the threshold value is zero, is set in advance in notification control part 8, and it determines the operation of operation part 3 on the basis of the set low start operation. More specifically, notification control part 8 can set the low start operation on the basis of the number of operation steps of operation part 3 required for the driver to start the vehicle.

For example, when the transmission switching part of operation part 3 is selected to the parking range, notification control part 8 can determine that the low start operation is executed. In general, when the transmission switching part is selected to the parking range, the driver starts the vehicle by switching the transmission switching part to the drive range after releasing the foot brake. That is, it is necessary for the driver to operate operation part 3 two times or more to start the vehicle. In view of this, by determining the low start operation based on whether the transmission switching part is selected to the parking range, i.e., whether there are two or more operation steps before the start of the vehicle, notification control part 8 can easily determine the low start operation.

Further, notification control part 8 may limit the direction in which the driver starts the vehicle and may set the low start operation for the operation that is estimated that there is no intention to start in the predetermined direction. For example, when the transmission switching part of operation part 3 is selected to the parking range and the reverse range, notification control part 8 may determine that the low start operation that is estimated that there is no driver's intention to start the vehicle forward is executed. That is, when the transmission switching part of operation part 3 is selected to the reverse range, notification control part 8 may determine it to be the low start operation with no driver's intention to start the vehicle forward. In general, to start the vehicle forward when the transmission switching part is selected to the reverse range, the transmission switching part is switched to the drive range after the foot brake is operated. That is, it is necessary for the driver to operate operation part 3 two times or more before starting the vehicle forward. In view of this, notification control part 8 can easily determine the low start operation with no intention to start it forward, by setting the low start operation based on whether the transmission switching part is selected to reverse, i.e., whether there are two or more operation steps before starting the vehicle forward.

In addition, when the transmission switching part is selected to the range other than the parking range, and the foot brake, the drive range of the transmission switching part or the slope start auxiliary apparatus is operated, notification control part 8 can determine the high start operation estimated to have an intention to start has been executed. In general, in the state where the transmission switching part of operation part 3 is selected to the range other than the parking range and the foot brake, the drive range of the transmission switching part or the slope start auxiliary apparatus is operated, the driver may possibly start the vehicle by operating operation part 3 one time.

For example, when the foot brake or the slope start auxiliary apparatus is operated, the vehicle may possibly be started by releasing the foot brake or the slope start auxiliary apparatus. In addition, when the drive range of the transmission switching part is operated, the vehicle may possibility be started by releasing the foot brake. In addition, when the transmission switching part is selected to the neutral range, the vehicle may possibility be started by switching it to the drive range. Note that for example, when the transmission switching part is selected to the neutral range and the foot brake is operated, it is assumed to be a single operation since the foot brake can be easily released while it is necessary to perform the release of the foot brake and the switch of the transmission switching part.

In view of this, when the transmission switching part is selected to the range other than the parking range, and the foot brake, the drive range of the transmission switching part or the slope start auxiliary apparatus is operated, i.e., when the vehicle can be started through a single operation, it is determined that a high start operation that is estimated to be a driver's intention to start has been executed, and thus, notification control part 8 can easily determine the high start operation.

In this manner, when it is determined that the low start operation has been executed, notification control part 8 controls notification part 9 so as to suppress the level of the notification than when the vehicle is travelling. For example, if a notification is provided from notification part 9 at the same degree as when the vehicle is travelling when the passenger is resting in the interior of cabin 1 and the driver does not intend to start the vehicle, the notification may be bothersome to the passenger. In view of this, when the low start operation that is estimated to have no intention to start has been executed, notification control part 8 suppresses the level of the notification than when the vehicle is travelling, and thus the notification that is bothersome to the passenger can be reduced.

For example, when the low start operation has been executed, notification control part 8 can control notification part 9 so as not to provide the notification. That is, notification control part 8 does not implement the notification of notification part 9 even when the approach signal indicating the approach of the object is input from calculation part 7. In this manner, the notification that is bothersome to the passenger can be reliably reduced.

Here, when the low start operation that is estimated that the driver has no intention to start the vehicle in a predetermined direction, e.g., forward, has been executed, notification control part 8 can control notification part 9 so as to suppress the level of the notification. For example, when the transmission switching part of operation part 3 is selected to the reverse range and the low start operation that is estimated to have no intention to start the vehicle forward has been executed, notification control part 8 can control notification part 9 so as to suppress the level of the notification. Here, detection part 6 is disposed in the front part of cabin 1, and mainly detects objects located in front of the vehicle and on the lateral side of the vehicle. In view of this, by controlling notification part 9 by limiting it to the intention to start the vehicle in the detection direction of detection part 6, notification control part 8 can more reliably suppress the notification that is bothersome to the passenger.

In addition, when the high start operation estimated to have an intention to start has been executed, notification control part 8 can control notification part 9 so as to set the level of the notification to a value greater than when the low start operation is executed and is smaller than when the vehicle is travelling. For example, notification control part 8 can control notification part 9 such that the notification is provided using speaker 10 and lamp 11 when the vehicle is travelling, that the notification is provided with only lamp 11 when the high start operation is executed, and that the notification is not provided when the low start operation has been executed. In this manner, the notification that is bothersome to the passenger can be appropriately reduced by controlling notification part 9 so as to change the level of the notification stepwise in accordance with the degree of the driver's intention to start. Note that the present invention is not limited to this, and it suffices that notification control part 8 can change the level of the notification stepwise. For example, notification control part 8 may change the level of the notification stepwise by changing the volume of speaker 10, or may change the level of the notification stepwise by changing the light quantity of lamp 11.

According to the present embodiment, when the low start operation that is estimated that there is no driver's intention to start is executed among the operations of operation part 3, notification control part 8 controls notification part 9 so as to suppress the level of the notification than when the vehicle is travelling, and thus the notification that is bothersome to the passenger can be reduced.

Note that while notification control part 8 determines the low start operation on the basis of the presence/absence of the driver's intention to start in the above-described Embodiment, the present invention is not limited to this as long as the low start operation can be determined. For example, notification control part 8 may determine the low start operation stepwise in accordance with the degree of the driver's intention to start. Then, notification control part 8 can control notification part 9 so as to change the level of the notification stepwise in accordance with the level of the low start operation. In this manner, the notification that is bothersome to the passenger can be appropriately reduced.

In addition, while notification control part 8 suppresses the level of the notification when the low start operation that is estimated to be no intention to start has been executed in the above-described Embodiment, the present invention is not limited to this and it suffices to suppress the level of the notification when the low start operation that is estimated that the intention to start is equal to or smaller than a predetermined threshold value has been executed. For example, when the parking brake is operated, notification control part 8 may suppress the level of the notification by determining that the low start operation with the intention to start equal to or smaller than the predetermined threshold value has been executed.

In addition, while notification control part 8 sets the low start operation on the basis of the number of steps of operation part 3 operated by the driver in the above-described Embodiment, the number of operation steps is not limitative and it suffices that the low start operation can be set based on the driver's intention to start. For example, notification control part 8 may also set the low start operation on the basis of the value of the braking force of operation part 3 that is operated to stop the vehicle and the like.

In addition, in the above-described Embodiment, notification control part 8 may determine the low start operation by using other information in addition to the operation information of operation part 3. For example, notification control part 8 may determine the low start operation by measuring the vehicle stopping time and estimating the degree of the driver's intention to start on the basis of the length of the time. For example, notification control part 8 may estimate that the intention to start the vehicle is smaller when a predetermined time has elapsed compared to immediately after the vehicle has stopped, even though the state of operation part 3 is the same, and notification control part 8 suppresses the level of the notification by determining the low start operation in accordance with this intention to start. In this manner, notification control part 8 can more reliably suppress the notification that is bothersome to the passenger.

In addition, while when the high start that is estimated to have an intention to start is executed, notification control part 8 controls notification part 9 so as to set the level of the notification to a value greater than when the low start operation has been executed and is smaller than when the vehicle is travelling in the above-described Embodiment, the present invention is not limited to this, and it suffices that when the low start operation that is estimated to have the intention to start that is equal to or smaller than a predetermined threshold value has been executed, the level of the notification can be suppressed than when the vehicle is travelling. For example, when the high start operation estimated to have an intention to start has been executed, notification control part 8 may determine that the intention to start is greater than the predetermined threshold value and provide the notification at the normal degree as when the vehicle is travelling.

In addition, in the above-described Embodiment, when the vehicle is stopped, notification control part 8 may control notification part 9 so as to suppress the level of the notification on the basis of the operation information of operation part 3 regardless of the driver's intention to start. For example, when the vehicle is stopped and the transmission switching part of operation part 3 is selected to the reverse range, notification control part 8 may control notification part 9 so as to suppress the level of the notification regardless of the driver's intention to start.

Here, detection part 6 is disposed in the front part of cabin 1, and mainly detects objects located in front of the vehicle and on the lateral side. In view of this, if the notification of the approach of the object is provided when the vehicle is stopped and the transmission switching part of operation part 3 is selected to the reverse range, the driver may misinterpret the presence of an object in front of the vehicle, which may cause confusion. In addition, there is a possibility that the driver may misunderstand that the detection range of the detection part 6 includes the rear of the vehicle and neglect to check the rear of the vehicle. In view of this, when the vehicle is stopped and the transmission switching part of operation part 3 is selected to the reverse range, notification control part 8 controls notification part 9 so as to suppress the level of the notification. For example, notification control part 8 controls notification part 9 so as to stop the notification. In this manner, misleading notifications to the driver can be suppressed.

Figure 2:
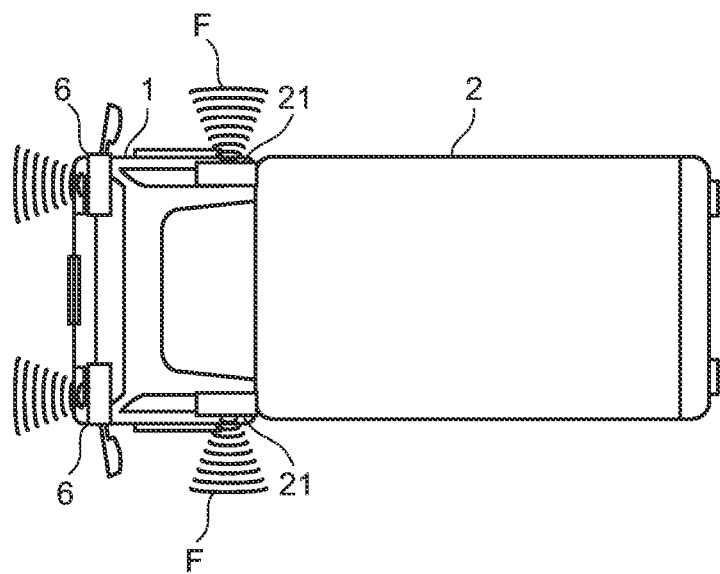
FIG. 2 is a diagram illustrating a configuration of a modification.

In addition, while detection part 6 is disposed in the vicinity of the right side part and the vicinity of left side part in the front part of cabin 1 in the above-described Embodiment, the present invention is not limited to this as long as an object approaching a vehicle can be detected. In addition, one detection part 6 may be disposed, and three or more detection parts 6 may be disposed. For example, as illustrated in FIG. 2, a pair of detection parts 21 may be additionally disposed separately from the pair of detection parts 6 of the above-described Embodiment. The pair of detection parts 21 has a configuration similar to that of detection part 6, and is disposed in the vicinity of the right side part and the vicinity of the left side part in the rear part of cabin 1. Detection part 21 includes the detection surface oriented to the right lateral side and the left lateral side of the vehicle, transmits and receives millimeter wave F from the detection surface, and detects the object present in the detection range extending in the front of the detection surface. In this manner, objects can be detected in a wide range from the vehicle front side to the vehicle lateral side.

In addition, while detection part 6 is composed of a millimeter-wave radar in the above-described Embodiment, the present invention is not limited to this as long as an object approaching a vehicle can be detected. For example, detection part 6 may be composed of an ultrasound sensor, a laser radar, a camera, or the like. It should be noted that detection part 6 is preferably composed of a millimeter-wave radar from a view point of rectilinearity and the like.

In addition, while loading part 2 is disposed to carry a load in the above-described Embodiment, the present invention is not limited to this as long as it is disposed at the rear of the vehicle relative to cabin 1.

This application is entitled to and claims the benefit of Japanese Patent Application No. 2020-013537 filed on Jan. 30, 2020, the disclosure each of which including the specification, drawings and abstract is incorporated herein by reference in its entirety.

The above-mentioned embodiments are merely examples of embodiments for implementing the invention, and the technical scope of the invention should not be interpreted as limited by these embodiments. In other words, the invention can be implemented in various forms without deviating from its gist or its main features. For example, the disclosure of the shape and number of each part described in the above form is only an example and can be changed and implemented as appropriate.

INDUSTRIAL APPLICABILITY

The notification apparatus according to the present disclosure can be used for an apparatus that detects an object approaching a vehicle and provides the notification of the approach of the object to the passenger.

REFERENCE SIGNS LIST

1 Cabin
2 Loading part
3 Operation part
4 Operation control part
5 Notification apparatus
6, 21 Detection part
7 Calculation part
8 Notification control part
9 Notification part
10 Speaker
11 Lamp
F Millimeter wave

The invention claimed is:

1. A notification apparatus comprising:
a notification part configured to detect an object located around a vehicle using radar and provide a passenger with a notification of presence of the object; and
a notification control part in which among operations of an operation part for operating the vehicle, a low start operation that is estimated that a driver's intention to start in a predetermined direction is equal to or smaller than a predetermined threshold value is set in advance, the notification control part being configured such that when the low start operation has been executed while the vehicle has been stopped, the notification control part controls the notification part so as to suppress a level of a notification than when the vehicle is travelling,
wherein the low start operation is a switching operation of a transmission switching part of the vehicle to a shifting position that starts the vehicle in a direction different from the detection direction of the object.

2. The notification apparatus according to claim 1, wherein the notification control part sets in advance, as the low start operation, an operation of the operation part estimated to not have the intention to start, and controls the notification part so as not to provide a notification when the low start operation has been executed.

3. The notification apparatus according to claim 2, wherein a high start operation that is estimated to have the intention to start in the predetermined direction among operations of operation part is set in advance, and
wherein, when the high start operation has been executed while the vehicle has been stopped, the notification control part suppresses the notification part so as to set the level of the notification to a level greater than when the low start operation has been executed and smaller than when the vehicle is travelling,
wherein the high start operation is an operation of a foot brake, a switching operation of a transmission switching part of the vehicle to a drive range, or a releasing operation of a slope start auxiliary apparatus in a state where the transmission switching part is selected to the range other than the parking range.

* * * * *